US010880388B1

(12) United States Patent
Huber et al.

(10) Patent No.: US 10,880,388 B1
(45) Date of Patent: Dec. 29, 2020

(54) AUTOMATIC REDIRECTION IN SCALE-OUT CLUSTER ENVIRONMENTS THAT PERFORM DISTRIBUTED DEDUPLICATION

(71) Applicant: EMC IP Holding Company LLC, Hopkinton, MA (US)

(72) Inventors: Andrew Huber, Chapel Hill, NC (US); Donna Barry Lewis, Holly Springs, NC (US); Keyur Desai, Cary, NC (US); William Formyduval, San Francisco, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 156 days.

(21) Appl. No.: 16/132,775

(22) Filed: Sep. 17, 2018

(51) Int. Cl.
| G06F 15/16 | (2006.01) |
| H04L 29/08 | (2006.01) |
| H04L 29/06 | (2006.01) |
| G06F 16/174 | (2019.01) |

(52) U.S. Cl.
CPC ...... *H04L 67/2814* (2013.01); *G06F 16/1748* (2019.01); *H04L 67/1097* (2013.01); *H04L 67/32* (2013.01); *H04L 67/40* (2013.01)

(58) Field of Classification Search
CPC . H04L 67/2814; H04L 67/1097; H04L 67/32; H04L 67/40; G06F 16/1748
See application file for complete search history.

(56) References Cited

U.S. PATENT DOCUMENTS

| 5,682,534 | A | * | 10/1997 | Kapoor | G06F 9/547 709/203 |
| 5,864,669 | A | * | 1/1999 | Osterman | G06F 9/547 709/201 |
| 8,443,153 | B1 | * | 5/2013 | Edwards | G06F 11/1076 711/147 |
| 8,484,259 | B1 | * | 7/2013 | Makkar | G06F 16/90335 707/827 |
| 9,313,604 | B1 | * | 4/2016 | Holcombe | H04W 28/06 |
| 9,712,427 | B1 | * | 7/2017 | Pittman | H04L 69/14 |
| 2011/0107358 | A1 | * | 5/2011 | Shyam | G06F 9/547 719/330 |
| 2015/0142981 | A1 | * | 5/2015 | Gonzales | H04L 65/1069 709/227 |

(Continued)

*Primary Examiner* — Douglas B Blair
(74) *Attorney, Agent, or Firm* — Dergosits & Noah LLP; Todd A. Noah

(57) ABSTRACT

Automatic redirection in scale-out cluster environments that perform distributed deduplication is described. A system converts a request from a client into a remote procedure call for a scale-out cluster. If the remote procedure call is a type that uses client-side redirection, the system identifies the node in the scale-out-cluster that is the correct node for the remote procedure call. If the client is not connected by any physical connection to the correct node, the system physically connects the client to the correct node by creating a physical connection within the virtual connection from the client to the scale-out cluster. If the remote procedure call is a write request, the system deduplicates the write request's data, uses the physical connection from the client to the correct node to send the write request and the deduplicated data to the correct node, and enables the correct node to store the deduplicated data.

20 Claims, 5 Drawing Sheets

(56) References Cited

U.S. PATENT DOCUMENTS

| | | | |
|---|---|---|---|
| 2015/0248366 A1* | 9/2015 | Bergsten | H04L 67/1097 710/308 |
| 2017/0249087 A1* | 8/2017 | Shekhar | G06F 3/0604 |
| 2018/0068211 A1* | 3/2018 | Butler | H04L 67/1097 |
| 2018/0075119 A1* | 3/2018 | Wang | G06F 16/27 |
| 2018/0173442 A1* | 6/2018 | Kirkpatrick | G06F 3/0659 |
| 2019/0108079 A1* | 4/2019 | Lian | G06F 9/54 |
| 2019/0236296 A1* | 8/2019 | Fair | H04L 67/40 |

* cited by examiner

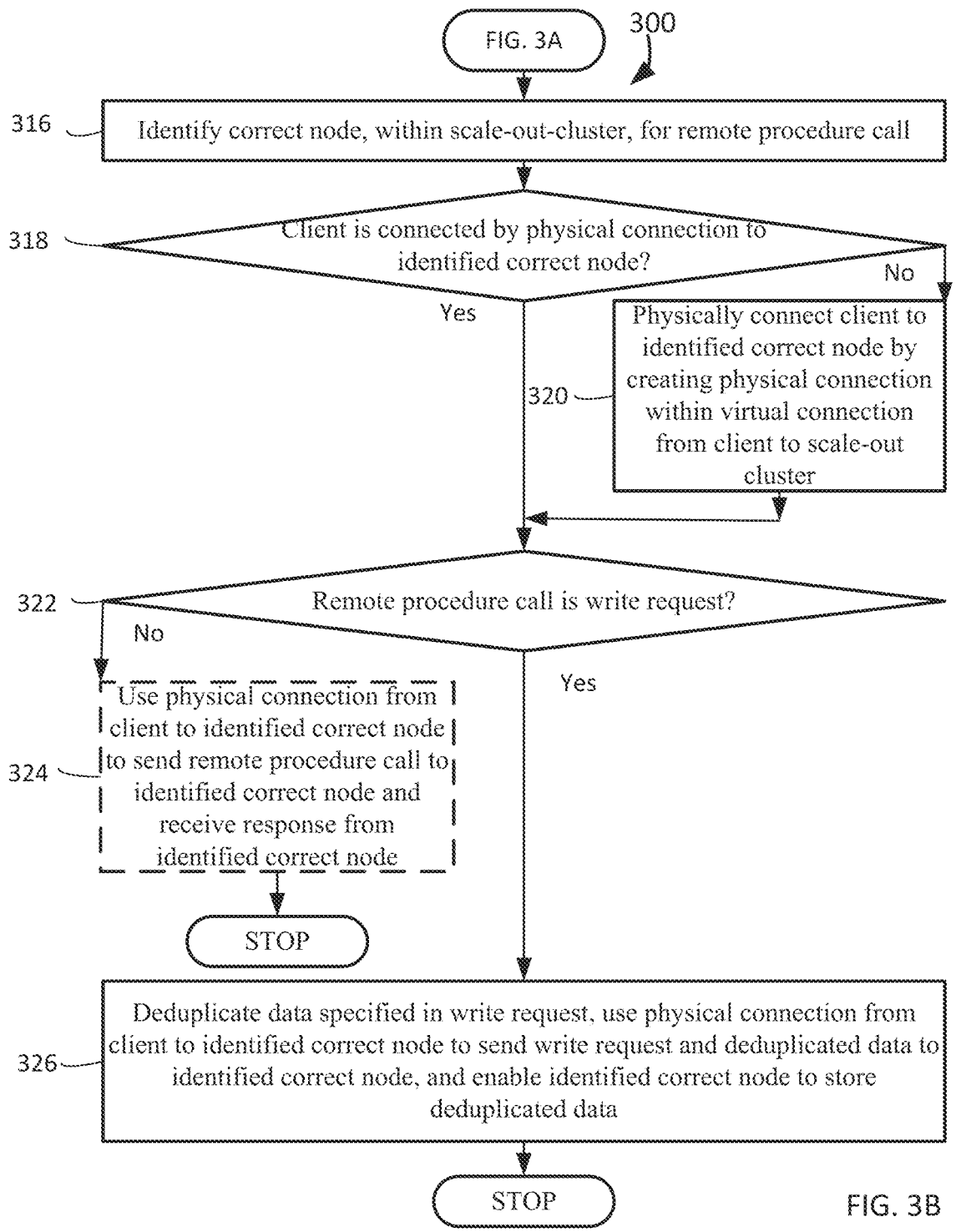

AUTOMATIC REDIRECTION IN SCALE-OUT CLUSTER ENVIRONMENTS THAT PERFORM DISTRIBUTED DEDUPLICATION

BACKGROUND

If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of data and these values' embedding in a database's data structures) within dedicated backup files. When the data protection administrator decides to return the data object to a previous state, the data protection administrator specifies the desired previous state by identifying a desired point in time when the data object was in this state, and then instructs the backup/restore application to execute a restore operation to restore a copy of the corresponding backup file(s) for that state to the data object.

A scale-out can be the addition of more nodes to a system, such as scaling out from a system that includes one web server to a system that includes three web servers. As computer prices drop and computer performance increases, system architects can configure hundreds of small computers in a cluster to obtain aggregate computing capabilities that often exceed that of computers based on a single traditional processor. A cluster can be a set of loosely or tightly connected computers that work together so that, in many respects, they are viewed as a single system. Unlike grid computers, a cluster has each node (a computer used as a server) set to perform the same task, controlled and scheduled by software. The components of a cluster are usually connected to each other through fast local area networks, with each node running its own instance of an operating system. In most circumstances, all of the nodes use the same type of hardware and the same type of operating system. Clusters are usually deployed to improve performance and availability over that of a single computer, while typically being more cost-effective than single computers of comparable speed or availability.

Some computer systems may provide a virtual machine, which can be a software implementation of a computer that executes programs like a physical device. A system virtual machine provides a complete system platform which supports the execution of a complete operating system, and usually emulates an existing architecture, including disks. Multiple instances of virtual machines lead to more efficient use of computing resources, both in terms of energy consumption and cost effectiveness, which is known as hardware virtualization, the key to a cloud computing environment. Such computer systems may provide a virtual server, which can be a software implementation of a host computer that runs computer programs which share their resources and/or services with client devices.

BRIEF DESCRIPTION OF THE DRAWINGS

FIGS. 3A-B is a flowchart that illustrates a method for automatic redirection in scale-out cluster environments that perform distributed deduplication, under an embodiment.

DETAILED DESCRIPTION

Figure 1:
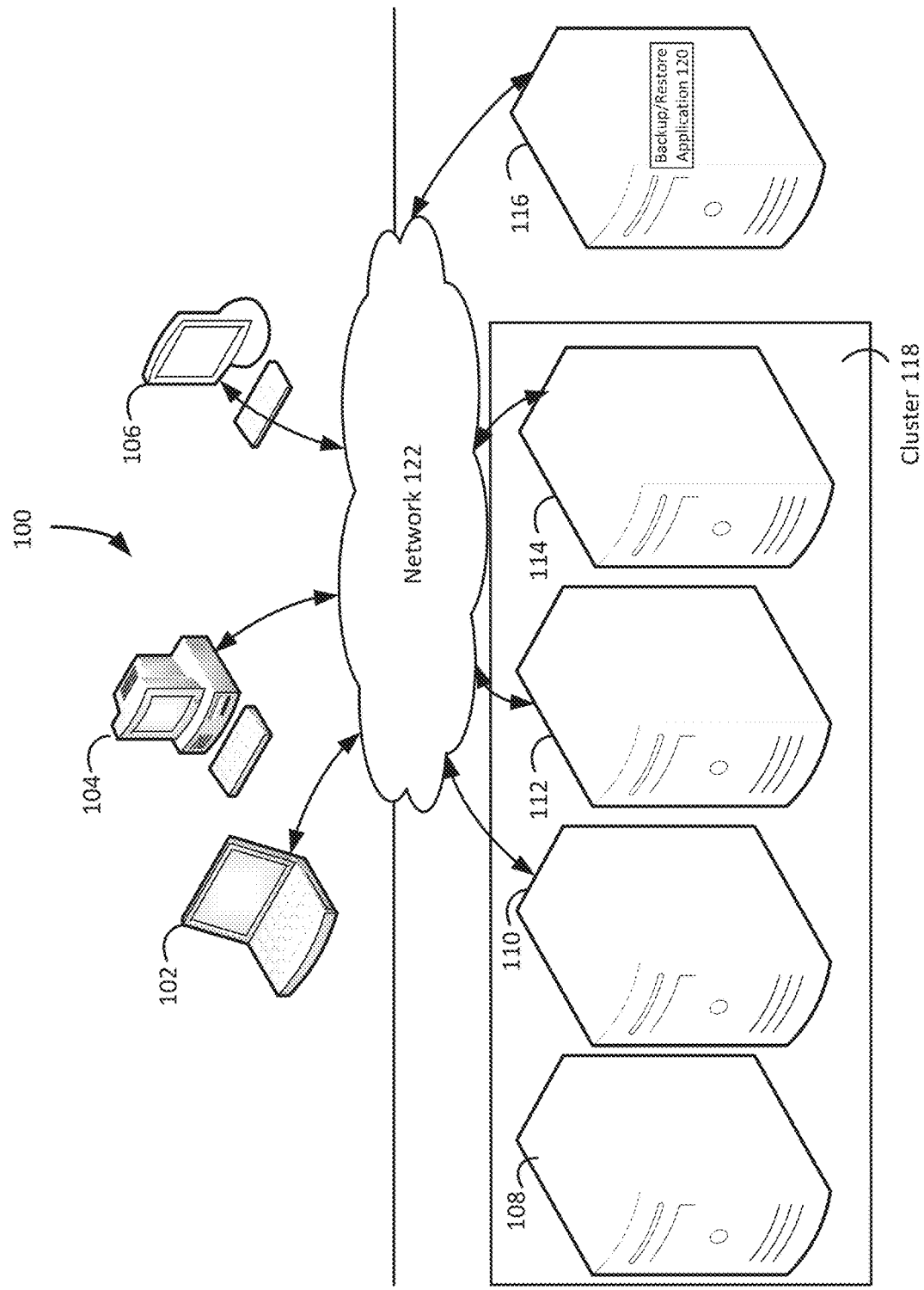
FIG. 1 illustrates a block diagram of an example system for automatic redirection in scale-out cluster environments that perform distributed deduplication, under an embodiment.

Distributed deduplication is a technology that uses client-side code and server-side code to deduplicate copies of user data both at the client, where the user data originated, and at the server, where the copies of the user data are stored. A backup/restore application calls the client-side code for distributed deduplication, which makes a network transmission control protocol (TCP) connection to the server and uses this connection while making calls to the server. These calls from the client to the server invoke remote procedure calls which send copies of the user data from the client to the server, with the client-side code and the server-side code together performing distributed deduplication of the copies of the user data before the copies of the user data are stored persistently on the server. In a scale-out cluster of computers, the server that stores the copies of the user data consists of multiple computers or nodes combined to appear as a single large server to the backup/restore application. The backup/restore application's copies of the user data and metadata may reside on any of the nodes in the scale-out cluster. In order that the backup/restore application does not have to be re-written or changed or have knowledge of the particular node(s) storing its user data, the distributed deduplication client-side and server-side code must direct calls to the correct node to store or retrieve the backup/restore application's copies of user data or metadata. Two techniques for directing calls are client-side redirection and server-side redirection. In client-side redirection, the client is responsible for sending calls to the proper node. Client-side redirection is more efficient than server-side redirection because client-side redirection does not overload the server side with redirecting traffic. Client-side redirection may result in extra messages between the client and the server because the client cannot always know in advance the correct node to send a call to, such that the client must re-send the call to the correct node if the client initially sends the call to the wrong node. In server-side redirection, if the node receiving a call is not the correct node, then the call-receiving node is responsible for forwarding the call to the correct node, receiving a response from the correct node, and returning the correct node's response to the client. With server-side redirection, there will be extra messages between the various nodes in the server whenever a call is not initially sent to the correct node by the client.

Embodiments herein provide automatic redirection in scale-out cluster environments that perform distributed deduplication. A system converts a request from a client into a remote procedure call for a scale-out cluster. If the remote procedure call is a type that uses server-side redirection, the system can enable a connected node to redirect the remote procedure call to the correct node for the remote procedure call and to respond to the remote procedure call on behalf of the correct node. If the remote procedure call is a type that uses client-side redirection, the system identifies the node in the scale-out-cluster that is the correct node for the remote procedure call. If the client is not connected by a physical connection to the identified correct node, the system physically connects the client to the identified correct node by creating a physical connection within the virtual connection from the client to the scale-out cluster. If the remote procedure call is a write request, the system deduplicates the write request's data, uses the physical connection from the client to the identified correct node to send the write request and the deduplicated data to the identified correct node, and enables the identified correct node to store the deduplicated data.

For example, client-side code converts a request from a backup/restore application for a laptop computer to write a backup copy of File B to a virtual scale-out cluster of computers into a remote procedure call, and then uses a client-side dispatch table to determine that the write request is a type of remote procedure call that uses client-side redirection. The client-side code identifies the third node in the virtual scale-out cluster as the correct node for writing the backup copy of the File B. Since the laptop is not connected by a physical connection to the third node, the client-side code connects the laptop to the third node by creating a physical connection within the virtual connection from the laptop to the virtual scale-out cluster, and then changes the virtual connection's active physical connection to be the physical connection to the third node. Since the remote procedure call is a write request, the client-side code deduplicates the backup copy of the File B, uses the active physical connection from the laptop to the third node to send the write request and the deduplicated backup copy of the File B to the third node, which enables the server-side code for distributed deduplication in the third node to store the deduplicated backup copy of the File B. The system combines both server-side and client-side redirection with the use of a virtual connection and a client-side dispatch table to get the advantages of both redirection schemes while avoiding extra messages whenever possible. This enables the system to provide distributed deduplication transparently to backup/restore applications in a scale-out cluster environment.

FIG. 1 illustrates a block diagram of a system that implements automatic redirection in scale-out cluster environments that perform distributed deduplication, under an embodiment. As shown in FIG. 1, system 100 may illustrate a cloud computing environment in which data, applications, services, and other resources are stored and delivered through shared data-centers and appear as a single point of access for the users. The system 100 may also represent any other type of distributed computer network environment in which servers control the storage and distribution of resources and services for different client users.

In an embodiment, the system 100 represents a cloud computing system that includes a first client 102, a second client 104, and a third client 106; and a first server 108, a second server 110, a third server 112, a fourth server 114, and a fifth server 116 that may be provided by a hosting company. Although FIG. 1 depicts the first client 102 as a laptop computer 102, the second client 104 as a personal computer 104, and the third client 106 as an Apple® Macintosh computer 106, each of the clients 102-106 may be any type of computer, such as a server. The servers 108-114 comprise a cluster 118 that does not include the fifth server 116. Therefore, the servers 108-114 may be referred to as the first node 108, the second node 110, the third node 112, and the fourth node 114 in the cluster 118. The fifth server 116 includes a backup/restore application 120. The clients 102-106 and the servers 108-116 communicate via a network 122. Any combination of the servers 108-116 may be any combination of physical computers and virtual machines, or virtual servers.

Although FIG. 1 depicts the system 100 with three clients 102-106, five servers 108-116, one cluster 118, one backup/restore application 120, and one network 122, the system 100 may include any number of clients 102-106, any number of servers 108-116, any number of clusters 118, any number of backup/restore applications 120, and any number of networks 122. The clients 102-106 and the servers 108-116 may each be substantially similar to the system 400 depicted in FIG. 4 and described below in reference to FIG. 4. FIG. 1 depicts the backup/restore application 120 residing completely on the fifth server 116, but the backup/application 120 may reside completely on any of the clients 102-106, completely on another server that is not depicted in FIG. 1, or in any combination of partially on the fifth server 116, partially on the clients 102-106, and partially on the other server. The backup/restore application 120 may provide a plug-in to any of the clients 102-106 and/or the servers 108-116 that enables any of the clients 102-106 and/or the servers 108-116 to execute the commands to back up and restore a data object. Even though the following paragraphs describe EMC Corporation's NetWorker® backup/restore application and EMC Corporation's Avamar® backup/restore application as examples of the backup/restore application 120, the backup/restore application 120 may be any other backup/restore application which provides the backup/restore functionalities described in the Background section.

The backup/restore application 120 may be an EMC Corporation's NetWorker® backup/restore application, which is a suite of enterprise level data protection software that unifies and automates backup to tape, disk-based, and flash-based storage media across physical and virtual environments for granular and disaster recovery. Cross-platform support is provided for many environments, including Microsoft Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environments. Add-on database and application modules provide backup services for products such as Microsoft® Exchange Server. Client backup data may be sent to a remote NetWorker® storage node or stored on a locally attached device by the use of a dedicated storage node. EMC Corporation's NetWorker® modules for Microsoft® applications supports Microsoft® products such as Microsoft® Exchange, Microsoft® Sharepoint, Microsoft® SQL Server, and Microsoft® Hyper-V servers. Although the functionality examples described in this paragraph apply to EMC Corporation's NetWorker® backup/restore application, one of skill in the art would recognize that other backup/restore applications and their corresponding functionalities may be used. The backup/restore application 120 may also be implemented as a NetWorker® Module For Microsoft Applications, which, as stated above, may reside completely on of the fifth server 116, completely on any of the clients 102-106, completely on another server that is not depicted in FIG. 1, or in any combination of partially on the fifth server 116, partially on the clients 102-106, and partially on the other server.

The backup/restore application 120 may be EMC Corporation's Avamar® backup/restore application, which provides fast, efficient backup and recovery through a complete software and hardware solution. Equipped with integrated variable-length deduplication technology, EMC Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for immediate single-step restore. The transmission of deduplicated backup data sends only changed blocks, reducing network traffic. EMC Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. EMC Corporation's Avamar® data store features redundant power and networking, redundant array of independent disks, and redundant array of inexpensive nodes technology to provide uninterrupted data accessibility. Periodic data systems checks ensure recoverability whenever needed. EMC Corporation's Avamar® systems may be deployed in an integrated solution with EMC Corporation's Data Domain® systems for high-speed backup and recovery of specific data types.

The fifth server 116, which may be referred to as the backup server 116, and/or the cluster 118 may be configured as an EMC Corporation's Data Domain server. The Data Domain operating system delivers scalable, high-speed, and cloud-enabled protection storage for backup, archive, and disaster recovery. Data Domain employs variable-length deduplication to minimize disk requirements, thereby reducing backup and archive storage requirements, and making disk a cost-effective alternative to tape. Deduplicated data may be stored onsite, for immediate restores and longer-term retention on disk, and replicated over a wide area network to a remote site or a service provider site in the cloud for disaster recovery operations, eliminating the need for tape-based backups or for consolidating tape backups to a central location. Data Domain provides the capability to consolidate both backup and archive data on the same infrastructure, thereby eliminating silos of backup and archive storage and associated overhead. Inline write and read verification protects against and automatically recovers from data integrity issues during data ingest and retrieval. Capturing and correcting I/O errors inline during the backup and archiving process eliminates the need to repeat backup and archive jobs, ensuring backups and archiving complete on time and satisfy service-level agreements. In addition, unlike other enterprise arrays or file systems, continuous fault detection and self-healing ensures data remains recoverable throughout its lifecycle on Data Domain. End-to-end data verifications reads data after it is written and compares it to what was sent to disk, proving that it is reachable through the file system to disk and that the data is not corrupted.

Although the following examples describe the client-side code and the server-side code as EMC Corporation's Data Domain Boost, the client-side and server-side code may be any type of client-side and server-side code. Data Domain Boost may provide a plug-in to any of the clients 102-106 and/or the servers 108-116 that enables any of the clients 102-106 and/or the servers 108-116 to distribute deduplication of a data object.

Figure 2A:
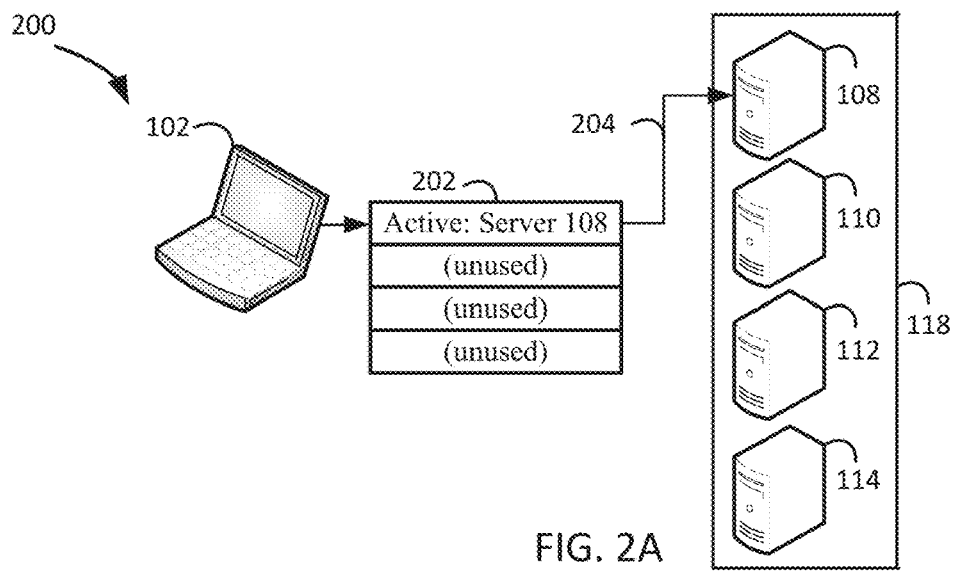
FIGS. 2A-C illustrate example connections for automatic redirection in scale-out cluster environments that perform distributed deduplication, under an embodiment

Upon receiving a request from a client to connect to a scale-out cluster, the client-side code can create a virtual connection from the client to the scale-out cluster, with the virtual connection including a physical connection from the client to a node in the scale-out cluster. For example, and without limitation, this can include the Data Domain Boost client-side code receiving a request from the laptop computer 102 to connect to the first node 108 in the scale-out cluster 118, and then creating a virtual connection 202 from the laptop computer 102 to the scale-out cluster 118, with the virtual connection 202 including a physical connection 204 from the laptop computer 102 to the first node 108 in the scale-out cluster 118, as depicted in FIG. 2A. The client-side code can connect to any of the nodes in the scale-out cluster by a physical connection. The virtual connection allows for physical connections to all nodes in the scale-out cluster, but the client-side code creates only one physical connection when the client-side code creates the virtual connection. A client can be a computer that is capable of obtaining information and/or applications from a server. A scale-out cluster can be an expanded group of computers that manage access to a centralized resource in a network. A node can be a computer that manages access to a centralized resource in a network. A request can be an instruction to a computer to provide information or perform another function. A virtual connection can be a simulated link between network components. A physical connection can be an actual link between network components.

To always send a remote procedure call to the correct node, the Data Domain Boost client-side code must have a physical connection to each node that the backup/restore application 120 needs to reference. The Data Domain Boost client-side code creates multiple physical connections on an as-needed basis, while hiding the existence of these physical connections from the backup/restore application 120. The backup/restore application 120 continues to make a single connect call, thus the backup/restore application 120 has only a single "logical" or "virtual" connection. At the Data Domain Boost client-side level, each virtual connection 202 starts off as a single physical connection, connecting to whatever node in the scale-out cluster 118 that the backup/restore application 120 specifies. When the backup/restore application 120 makes requests that use client-side redirection, the Data Domain Boost client-side code dynamically and automatically creates a physical connection to the correct node if a physical connection does not already exist for the correct node. A single virtual connection 202 can enable writing data to multiple nodes 108-114, enhancing distributed filtering of references and helping balance server deduplication load.

Some time after connecting the client to the scale-out cluster via the virtual connection 202, the client-side code converts a request from a client into a remote procedure call for the scale-out cluster, and then determines whether the remote procedure call is a type of remote procedure call that uses client-side redirection, server-side redirection, no redirection, or special case redirection. By way of example and without limitation, this can include the backup/restore application 120 for the laptop computer 102 making a function call to a Data Domain Boost Application Programming Interface (API) to retrieve system information from the virtual scale-out cluster 118, and the Data Domain Boost client-side code converting the request to retrieve system information into a remote procedure call and then accessing a client-side dispatch table to determine that the request to retrieve system information is a type of remote procedure call that uses no redirection.

This client-side dispatch table contains an entry for every type of remote procedure call. Each entry indicates which type of redirection is used for a type of remote procedure call. The client-side dispatch table specifies for each type of remote procedure call if the remote procedure call can be sent to any node (hence uses server-side redirection if necessary) or must be sent to a specific node (hence client-side redirection is used, and the Data Domain Boost client-side sends the remote procedure call to a specific node). One type of remote procedure call can be processed by any node, such that no redirection of any kind is needed, such that the remote procedure call is sent to any node and the receiving node will respond.

The other type of remote procedure call can be sent to any node, but must be processed by one correct node, and therefore undergoes server-side redirection. This other type of remote procedure call can be sent to any node, but if the receiving node is not the correct node for the remote procedure call, the receiving node will redirect the remote procedure call to its correct node.

At one level these two types of remote procedure calls can appear the same and be processed the same by the client-side code, because in either case the client-side code can send the remote procedure call to any node. However, the client-side code may differentiate between these two types in some cases. Types of remote procedure calls that use special case redirection include types of remote procedure calls that are not supported, which result in returning an error message to the backup/restore application, and types of remote procedure calls which need special handling. A remote procedure call can be a computer program causing a subroutine to execute on another computer, and which is coded as if it were a local subroutine. A type can be a category of things having common characteristics. Client-side redirection can be a computer, which is capable of obtaining information and applications from a server, assigning something to a new or different server.

If the remote procedure call is not a type of remote procedure call that uses any redirection, the client-side code uses the active physical connection from the client to the connected node to send the remote procedure call to the scale-out cluster. In embodiments, this can include the Data Domain Boost client-side code using the virtual connection 202's active physical connection 204 from the laptop computer 102 to the connected first node 108 to send the request for system information to the scale-out cluster 118. A connected node can be a linked computer that manages access to a centralized resource in a network.

Following the sending of the remote procedure call, the server-side code can determine whether the sent remote procedure call is a type of remote procedure call that uses server-side redirection. For example, and without limitation, this can include the Data Domain Boost server-side code determining that the request to retrieve system information is not a type of remote procedure call that uses server-side redirection. A sent remote procedure call can be the delivery of a computer program that causes a subroutine to execute on another computer, and which is coded as if it were a local subroutine. Server-side redirection can be a computer, which shares its resources and/or services with client devices, assigning something to a new or different computer that shares its resources and/or services with client devices.

If the sent remote procedure call is not a type of remote procedure call that uses server-side redirection, the server-side code enables the connected node to respond to the sent remote procedure call. By way of example and without limitation, this can include the Data Domain Boost server-side code enabling the connected first node 108 to use the physical connection 204 to respond to the laptop computer 102 with the requested system information that identifies the cluster 118 as a virtual scale-out cluster.

While the request to retrieve system information is only one example of a type of a remote procedure call that uses no redirection, the client-side code can receive other types of remote procedure calls. In embodiments, this can include the Data Domain Boost client-side code receiving a request from the backup/restore application 120 for the laptop computer 102 to retrieve the location of the File A from the virtual scale-out cluster 118, and then accessing a client-side dispatch table to determine that the request to retrieve the location of a file is a type of remote procedure call that uses server-side redirection.

If the remote procedure call is a type of remote procedure call that uses server-side redirection, the client-side code uses the active physical connection from the client to the connected node to send the remote procedure call to the scale-out cluster. For example, and without limitation, this can include the Data Domain Boost client-side code using the virtual connection 202's active physical connection 204 from the laptop computer 102 to the connected first node 108 to send the request to retrieve the location of the File A to the scale-out cluster 118.

The remote procedure call having been sent, the server-side code can determine whether the sent remote procedure call is a type of remote procedure call that uses server-side redirection. For example, and without limitation, this can include the Data Domain Boost server-side code determining that a request to retrieve the location of a file is a type of remote procedure call that uses server-side redirection. The Data Domain Boost server-side code uses server-side redirection when appropriate, for simple one-time only operations where any node can forward the specific request to the node that must execute the request, avoiding having to reply with an error to the client and forcing the client to resend the request to the correct node.

Figure 2B:
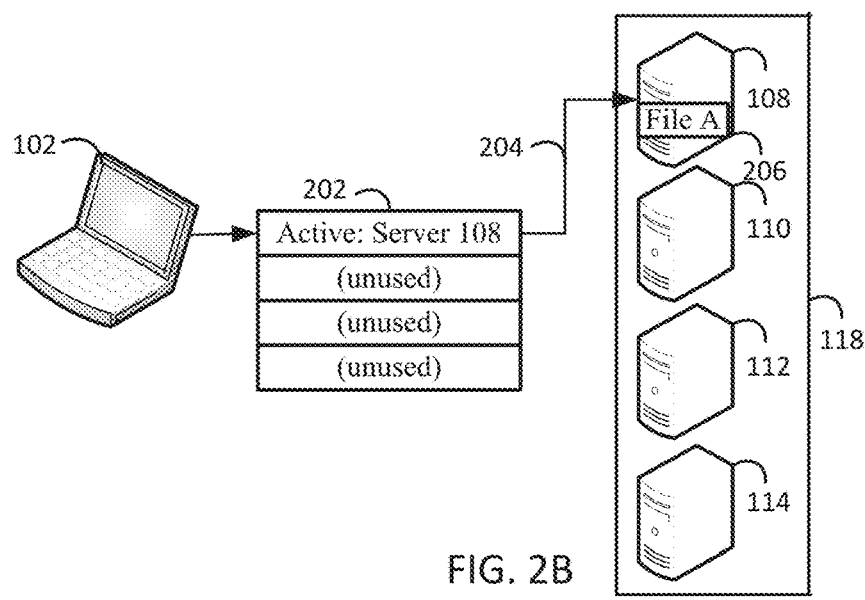

If the sent remote procedure call is a type that uses server-side redirection, the server-side code determines whether the connected node is the correct node for the sent remote procedure call. By way of example and without limitation, this can include the Data Domain Boost server-side code determining that the connected first node 108 is the correct node to retrieve the location of the File A 206 because the connected first node 108 stores the File A 206, as depicted in FIG. 2B. In an alternative example, the Data Domain Boost server-side code determines that the connected first node 108 is not the correct node to retrieve the location of the File B 208 because the connected first node 108 does not store the File B 208. A correct node can be the right computer to manage access to a centralized resource in a network.

If the connected node is the correct node for the sent remote procedure call, the server-side code enables the connected node to respond to the sent remote procedure call. In embodiments, this can include the Data Domain Boost server-side code enabling the connected first node 108 to use the physical connection 204 to respond to the laptop computer 102 with the location of File A 206.

Figure 2C:
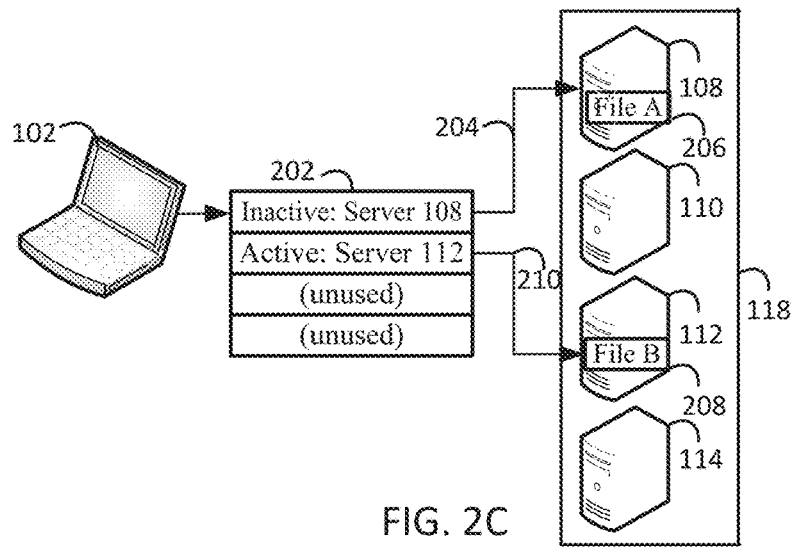

If the connected node is not the correct node for the sent remote procedure call, the server-side code enables the connected node to redirect the sent remote procedure call to the correct node for the sent remote procedure call and to respond to the sent remote procedure call on behalf of the correct node for the sent remote procedure call. For example, and without limitation, this can include the Data Domain Boost server-side code enabling the connected first node 108 to redirect the request for the location of the File B 208 to the correct third node 112 that stores the File B 208, such that the correct third node 112 returns the location of the File B 208 to the connected first node 108, which uses the active physical connection 204 to respond to the laptop computer 102 with the location of File B 208, as depicted in FIG. 2C. The request is typically not sent to the third node 112 because the first node 108 typically has the location information.

While the request to retrieve the location of a file is only one example of a type of a remote procedure call that uses server-side redirection, the client-side code can receive other types of remote procedure calls. By way of example and without limitation, this can include the Data Domain Boost client-side code receiving a request from the backup/restore application 120 for the laptop computer 102 to read File A 206 from the virtual scale-out cluster 118, and then accessing a client-side dispatch table to determine that the request to read a file is a type of remote procedure call that uses client-side redirection.

If the remote procedure call is a type that uses client-side redirection, the client-side code identifies the node in the scale-out-cluster that is the correct node for the remote procedure call. In embodiments, this can include the Data Domain Boost client-side code identifying the first node 108 in the virtual scale-out cluster 118 as the correct node for reading the File A 206. Identifying the correct node for the remote procedure call may include identifying a node that was previously identified as a correct node for a previous remote procedure call, and/or using the physical connection from the client to the connected node to send the remote procedure call to the connected node and receive a response identifying the correct node. For example, the Data Domain Boost client-side code uses a file descriptor data structure, which previously recorded that the File A 206 was stored on the first node 108, to identify the first node 108 as the correct node for reading or writing the File A 206. If the file descriptor data structure does not identify the location of the file A 206, the Data Domain Boost client-side code sends the request to read or write the File A 206 to the connected first node 108, which determines that the connected first node 108 stores the File A 206, and responds to the laptop computer 102 with the location of File A 206 on the connected first node 108. A previous remote procedure call can be a computer program having already caused a subroutine to execute on another computer, and which was coded as if it were a local subroutine.

After identifying the correct node for the remote procedure call, the client-side code determines whether the client is connected by a physical connection to the identified correct node. For example, and without limitation, this can include the Data Domain Boost client-side code determining that the laptop computer 102 is connected by the physical connection 204 to the first node 108, which stores the requested File A 206. An identified correct node can be a computer established as the right computer to manage access to a centralized resource in a network.

Following verification that the client has a physical connection to the identified correct node, the client-side code uses the active physical connection from the client to the identified correct node to send the remote procedure call to the identified correct node and receive a response from the identified correct node. If the physical connection to the correct node is not already the active physical node, then the physical connection to the correct node is made the active physical node. By way of example and without limitation, this can include the Data Domain Boost client-side code using the physical connection 204 from the laptop computer 102 to the first node 108 to send the request to read the file A 206 to the identified first node 108 and receive a copy of the File A 206 from the first node 108. A response can be a reply to a request.

While a request to read a file from a connected node is only one example of a type of a remote procedure call that uses client-side redirection, the client-side code can receive other types of remote procedure calls that use client-side redirection. In embodiments, this can include the Data Domain Boost client-side code receiving a request from the backup/restore application 120 for the laptop computer 102 to read the File B 208 from the virtual scale-out cluster 118, and then accessing a client-side dispatch table to determine that the request to read the File B 208 is a type of remote procedure call that uses client-side redirection. In an alternative example, the Data Domain Boost client-side code receives a request from the backup/restore application 120 for the laptop computer 102 to write the File B 208 to the virtual scale-out cluster 118, and then accesses a client-side dispatch table to determine that the request to write the File B 208 is a type of remote procedure call that uses client-side redirection. The Data Domain Boost client-side code uses client-side redirection for some repeated operations, such as read and write operations. Since read, write, and similar requests are typically executed many times by the backup/restore application 120, using client-side redirection to ensure these requests go directly to the correct node is more efficient, as extra intra-node messages are eliminated.

If the remote procedure call is a type of remote procedure call that uses client-side redirection, the client-side code identifies the node in the scale-out-cluster that is the correct node for the remote procedure call. For example, and without limitation, this can include the Data Domain Boost client-side code identifying the third node 112 in the virtual scale-out cluster 118 as the correct node for reading the File B 208. In an alternative example, the Data Domain Boost client-side code identifies the third node 112 in the virtual scale-out cluster 118 as the correct node for writing the File B 208. Identifying the correct node for the remote procedure call may include identifying a node that was previously identified as a correct node for a previous remote procedure call, and/or using the physical connection from the client to the connected node to send the remote procedure call to the connected node and receive a response identifying the correct node. For example, the Data Domain Boost client-side code uses a file descriptor data structure, which previously recorded that the File B 208 was stored on the third node 112, to identify the third node 112 as the correct node for reading or writing the File B 208. If the file descriptor data structure does not identify the location of the file B 208, the Data Domain Boost client-side code sends the request to read or write the File B 208 to the connected first node 108, which determines that the third node 112 stores the File B 208, the third node 112 returns the location of the File B 208 to the connected first node 108, which responds to the laptop computer 102 with an error message for the read or write request and the location of File B 208 on the third node 112. Since the first node 108 will typically have the information, the first node 108 will not typically need to send the request to the third node 112, and the first node 108 will typically respond directly to the laptop computer 102 and identify the correct node.

After identifying the correct node for the remote procedure call, the client-side code determines whether the client is connected by a physical connection to the identified correct node. By way of example and without limitation, this can include the Data Domain Boost client-side code determining whether the laptop computer 102 is connected by any physical connection to the third node 112, which stores the File B 208.

If the client is not connected by any physical connection to the identified correct node, the client-side code physically connects the client to the identified correct node by creating a physical connection within the virtual connection from the client to the scale-out cluster. In embodiments, this can include the Data Domain Boost client-side code creating the physical connection 210 (within the virtual connection 202 from the laptop computer 102 to the virtual scale-out cluster 118) from the laptop computer 102 to the third node 112, which stores the File B 208, and then changing the virtual connection 202's active physical connection to be the physical connection 210 to the third node 112, as depicted by FIG. 2C.

Following the creation of a physical connection from the client to the correct node, the client-side code uses the active physical connection from the client to the identified correct node to send the remote procedure call to the identified correct node and receive a response from the identified correct node. For example, and without limitation, this can include the Data Domain Boost client-side code using the physical connection 210 from the laptop computer 102 to the third node 112 to send the request to read the file B 208 to the third node 112 and receive a copy of the File B 208 from the third node 112.

If the remote procedure call is a write request, after a physical connection is created from the client to the identified correct node, the client-side code deduplicates data specified by the write request, uses the active physical connection from the client to the identified correct node to send the write request and the deduplicated data to the identified correct node, and then enables the identified correct node to store the deduplicated data. By way of example and without limitation, this can include the Data Domain Boost client-side code deduplicating the backup copy of file B 208, using the physical connection 210 from the laptop computer 102 to the third node 112 to send the write request and the deduplicated backup copy of file B 208 to the third node 112, which enables the Data Domain Boost server-side code in the third node 112 to store the deduplicated backup copy of file B 208. Write operations continue to undergo distributed deduplication. Client-side deduplication processing continues to operate exactly as before, while server-side deduplication processing now occurs when and where each node stores files. Files can be created on the node that optimizes deduplication with the assurance that the client can always access the file efficiently. A write request can be an instruction to a computer to record information. Data can be information. Deduplicated data can be information from which redundant information has been eliminated.

The Data Domain Boost client-side code continues to use the virtual connection 202's active physical connection 210 as long as the subsequent remote procedure calls do not use client-side redirection to a different node than the node specified by the active connection. As long as any remote procedure call requiring client-side redirection needs to go to the node specified by the active connection, the active physical connection continues to be used. If client-side redirection is used by a subsequent remote procedure call, the Data Domain Boost client-side code determines if any of the existing physical connections 204 or 210 in the virtual connection 202 connect to the correct node. If so, the Data Domain Boost client-side code uses that existing physical connection 204 or 210. For example, the Data Domain Boost client-side code would use the existing physical connection 210 or 204 to access a File C (not depicted by FIGS. 2A-C) on the third node 112 or a File D (not depicted by FIGS. 2A-C) on the first node 108. If a remote procedure call uses client-side redirection to access a node without an existing physical connection, such as a File E (not depicted by FIGS. 2A-C) on the second node 110, the Data Domain Boost client-side code would create a new physical connection to the correct node, add the new physical connection to the virtual connection 202, and then use the newly created physical connection as the active physical connection to send the remote procedure call to the correct and physically connected node. Over time, the virtual connection 202 may grow to have one physical connection to each of the nodes 108-114 in the scale-out cluster 118.

Using multiple physical connections established dynamically on an as-needed basis only when the client-side dispatch table indicates that the type of the received remote procedure call uses client-side redirection, the Data Domain Boost client-side code efficiently implements client-side redirection while hiding the need for client-side redirection and multiple physical connections from the backup/restore application 120. Hiding these features from the backup/restore application 120 enables the backup/restore application 120 to execute effectively and efficiently in a scale-out cluster environment with no changes needed to the backup/restore application 120 and with no changes in how the backup/restore application 120 operates.

With the virtual connection 202 implementing multiple physical connections 204 and 210 to multiple nodes 108 and 112 to write files on those nodes 108 and 112, the work to filter data and detect duplicated data is now distributed across the nodes 108 and 112 storing the Files A 206 and B 208. The virtual connection 202 facilitates distributed filtering of references on the written data, and also balances the server-side deduplication processing across the nodes 108-114 in the cluster 118.

Data Domain Boost uses distributed deduplication to minimize the data actually sent to a server, significantly decreasing network bandwidth usage and lowering the time to create backup files. The Data Domain Boost deduplication mechanisms operate unchanged because the Data Domain Boost client-side and server-side code automatically redirect each remote procedure call to the correct node. Data Domain Boost client-side and server-side code combines both client-side redirection and server-side redirection with distributed deduplication, which means no performance penalty is incurred in critical distributed deduplication input/output (I/O) execution paths because I/O remote procedure calls are always sent to the correct node. This automatic redirection enables distributed deduplication to continue to provide its benefits in a scale-out cluster environment. Data Domain Boost combines both server-side and client-side redirection with the use of a virtual connection and a client-side dispatch table to get the advantages of both redirection schemes while avoiding extra messages whenever possible. This enables Data Domain Boost to provide distributed deduplication transparently to backup/restore applications in a scale-out cluster environment.

FIGS. 2A-C illustrate example connections for automatic redirection in scale-out cluster environments that perform distributed deduplication, under an embodiment. FIG. 2A depicts a scale-out cluster environment 200, in which the virtual connection 202 from the laptop computer 102 to the scale-out cluster 118 has been created, with the virtual connection 202 including a physical connection 204 from the laptop computer 102 to the first node 108 in the scale-out cluster 118, with the rest of the physical connections in the virtual connection 202 remaining unestablished. FIG. 2B depicts the scale-out cluster environment 200, in which the connected first node 108 stores the File A 206. FIG. 2C depicts the scale-out cluster environment 200, in which the physical connection 210 (within the virtual connection 202 from the laptop computer 102 to the virtual scale-out cluster 118) has been created from the laptop computer 102 to the third node 112, which stores the File B 208, and the virtual connection 202's active physical connection is changed to be the physical connection 210 to the third node 112.

Figure 3A:
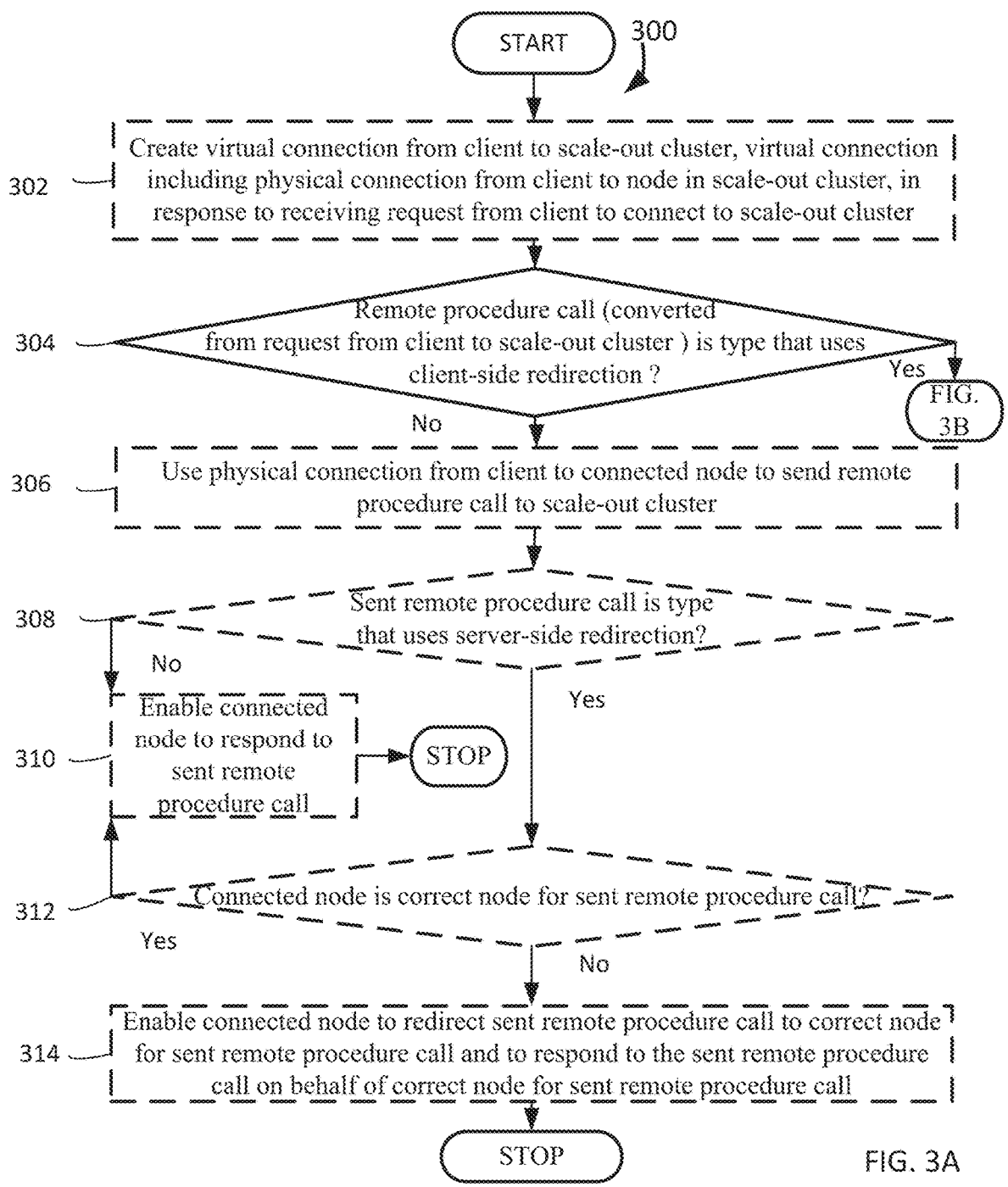

FIGS. 3A-B is a flowchart that illustrates a method for automatic redirection in scale-out cluster environments that perform distributed deduplication, under an embodiment. Flowchart 300 illustrates method acts illustrated as flowchart blocks for certain steps involved in and/or between the clients 102-106 and/or the servers 108-116 of FIG. 1.

A virtual connection is optionally created from a client to a scale-out cluster, with the virtual connection including a physical connection from the client to a node in the scale-out cluster, in response to receiving a request from the client to connect to the scale-out cluster, block 302. The system connects a client to a scale-out cluster. For example, and without limitation, this can include the Data Domain Boost client-side code receiving a request from the laptop computer 102 to connect to the scale-out cluster 118, and then creating a virtual connection 202 from the laptop computer 102 to the scale-out cluster 118, with the virtual connection 202 including a physical connection 204 from the laptop computer 102 to the first node 108 in the scale-out cluster 118.

Some time after connecting the client to the scale-out cluster, a determination is made whether a remote procedure call is a type that uses client-side redirection, in response to converting a request from a client into the remote procedure call for the scale-out cluster. block 304. The system determines whether types of remote procedure calls use client-side redirection. By way of example and without limitation, this can include backup/restore application 120 for the laptop computer 102 making a function call to a Data Domain Boost Application Programming Interface (API) to write a backup copy of the File B 208 to the virtual scale-out cluster 118, the Data Domain Boost client-side code converting the write request into a remote procedure call and then determining that the write request is a type of remote procedure call that uses client-side redirection. If the remote procedure call is a type of remote procedure call that uses client-side redirection, the method 300 proceeds to block 316 for client-side redirection. If the remote procedure call is not a type of remote procedure call that uses client-side redirection, the method 300 continues to block 306 to send the remote procedure call to the scale-out cluster.

If the remote procedure call is not a type of remote procedure call that uses client-side redirection, the physical connection from the client to the connected node is optionally used to send the remote procedure call to the scale-out cluster, block 306. The system sends remote procedure calls to the scale-out cluster. In embodiments, this can include the Data Domain Boost client-side code using the virtual connection 202's active physical connection 204 from the laptop computer 102 to the connected first node 108 to send the request for system information to the scale-out cluster 118.

Following the sending of the remote procedure call, a determination is optionally made whether the sent remote procedure call is a type that uses server-side redirection, block 308. The system determines whether remote procedure calls use server-side redirection. For example, and without limitation, this can include the Data Domain Boost server-side code determining that a request to retrieve system information is not a type of remote procedure call that uses server-side redirection. If the sent remote procedure call is not a type of remote procedure call that uses server-side redirection, the method 300 continues to block 310 to enable the connected node to respond. If the sent remote procedure call is a type that uses server-side redirection, the method 300 continues to block 312 to determine if the connected node is the correct node for the remote procedure call.

If the sent remote procedure call is not a type of remote procedure call that uses server-side redirection, the connected node is optionally enabled to respond to the sent remote procedure call, block 310. The system enables the connected node to respond to remote procedure calls that do not use server-side redirection. By way of example and without limitation, this can include the Data Domain Boost server-side code enabling the connected first node 108 to use the physical connection 204 to respond to the laptop computer 102 with the requested system information that identifies the cluster 118 as a virtual scale-out cluster. Then the method 300 stops, which enables the method 300 to process the next remote procedure call.

If the sent remote procedure call is a type of remote procedure call that uses server-side redirection, a determination is optionally made whether the connected node is the correct node for the sent remote procedure call, block 312. The system determines whether the connected node is the correct node for the remote procedure call. In embodiments, this can include the Data Domain Boost server-side code determining that the connected first node 108 is not the correct node to retrieve the location of the File B 208 because the connected first node 108 does not store the File B 208. If the connected node is the correct node for the sent remote procedure call, the method 300 returns to block 310 to enable the identified correct and connected node to respond. If the connected node is not the correct node for the sent remote procedure call, the method 300 continues to block 314 to enable the connected node to redirect the remote procedure call to the correct node for the sent remote procedure call.

If the connected node is not the correct node for the sent remote procedure call, the connected node is enabled to redirect the sent remote procedure call to the correct node for the sent remote procedure call and to respond to the sent remote procedure call on behalf of the correct node for the sent remote procedure call, block 314. The system can use automatic server-side redirection to respond to the remote procedure call. For example, and without limitation, this can include the Data Domain Boost server-side code enabling the connected first node 108 to redirect the request for the location of the File B 208 to the correct third node 112 that stores the File B 208, such that the correct third node 112 returns the location of the File B 208 to the connected first node 108, which uses the active physical connection 204 to respond to the laptop computer 102 with the location of File B 208. Then the method 300 stops, which enables the method 300 to process the next remote procedure call.

If the remote procedure call is a type of remote procedure call that uses client-side redirection, the correct node within the scale-out cluster is identified for the remote procedure call, block 316. The system identifies the correct node for remote procedure calls that use client-side redirection. By way of example and without limitation, this can include the Data Domain Boost client-side code identifying the third node 112 in the virtual scale-out cluster 118 as the correct node for writing the backup copy of the File B 208.

Having identified the correct node for the remote procedure call, a determination is made whether the client is connected by a physical connection to the identified correct node block 318. The system determines if the client is physically connected to the correct node for the remote procedure call. In embodiments, this can include the Data Domain Boost client-side code determining whether the laptop computer 102 is connected by any physical connection to the third node 112 that is identified as the correct node for the remote procedure call. If the client is not connected by any physical connection to the identified correct node, the method 300 continues to block 320 to physically connect the client to the identified correct node. If the client is already connected by any physical connection to the identified correct node, the method 300 proceeds to block 322 to determine if the remote procedure call is a write request.

If the client is not connected by any physical connection to the identified correct node, the client is physically connected to the identified correct node by creating a physical connection within the virtual connection from the client to the scale-out cluster, block 320. The system physically connects the client to the correct node, if the client is not already connected to the correct node. For example, and without limitation, this can include the Data Domain Boost client-side code creating the physical connection 210 (within the virtual connection 202 from the laptop computer 102 to the virtual scale-out cluster 118) from the laptop computer 102 to the third node 112, and then changing the virtual connection 202's active physical connection to be the physical connection 210 to the third node 112.

After a physical connection is either verified or created from the client to the correct node, a determination is made whether the remote procedure call is a write request, block 322. The system determines whether the remote procedure call is a write request. By way of example and without limitation, this can include the Data Domain Boost client-side code determining that the remote procedure call is a write request. If the remote procedure call is not a write request, the method 300 continues to block 324 to enable the correct node to respond to the remote procedure call. If the remote procedure call is a write request, the method 300 proceeds to block 326 for distributed deduplication is a scale-out cluster.

If the remote procedure call is not a write request, the physical connection from the client to the identified correct node is used to send the remote procedure call to the identified correct node and receive a response from the identified correct node, block 324. The system enables the correct node to respond to the remote procedure call. In embodiments, this can include the Data Domain Boost using the active physical connection 210 from the laptop computer 102 to the third node 112 to send the request to read the File B 208 to the third node 112 and receive the File B 208 from the third node 112. Then the method 300 stops, which enables the method 300 to process the next remote procedure call.

If the remote procedure call is a write request, data specified by the write request is deduplicated, the physical connection from the client to the identified correct node is used to send the write request and the deduplicated data to the identified correct node, and the identified correct node is enabled to store the deduplicated data, block 326. The system distributes deduplication is a scale-out cluster environment. For example, and without limitation, this can include the Data Domain Boost client-side code deduplicating the backup copy of the File B 208, using the active physical connection 210 from the laptop computer 102 to the third node 112 to send the write request and the deduplicated backup copy of the File B 208 to the third node 112, which enables the Data Domain Boost server-side code in the third node 112 to store the deduplicated backup copy of the File B 208. Then the method 300 stops, which enables the method 300 to process the next remote procedure call.

Although FIGS. 3A-B depicts the blocks 302-326 occurring in a specific order, the blocks 302-326 may occur in another order. In other implementations, each of the blocks 302-326 may also be executed in combination with other blocks and/or some blocks may be divided into a different set of blocks.

Figure 4:
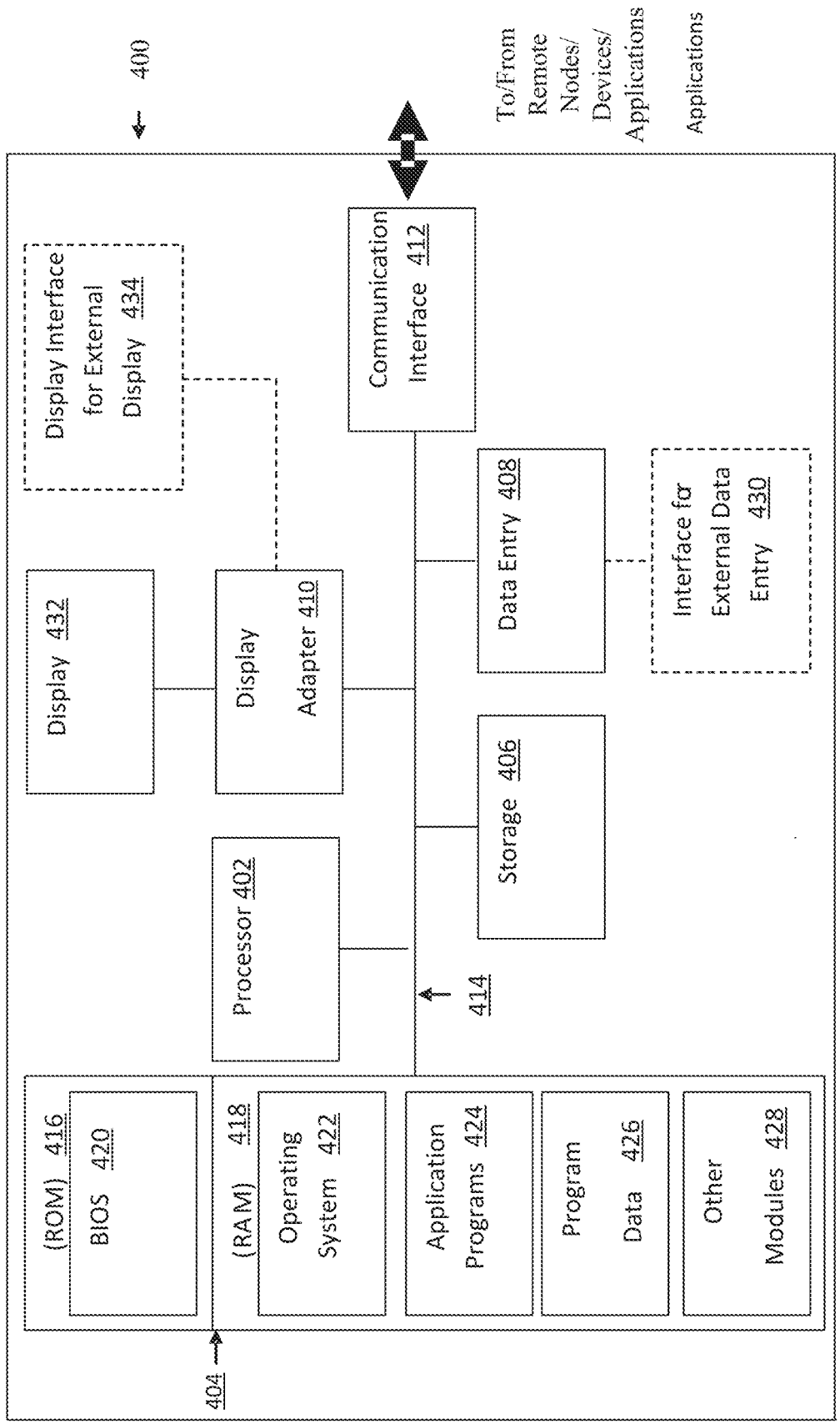
FIG. 4 is a block diagram illustrating an example hardware device in which the subject matter may be implemented.

Having described the subject matter in detail, an exemplary hardware device in which the subject matter may be implemented shall be described. Those of ordinary skill in the art will appreciate that the elements illustrated in FIG. 4 may vary depending on the system implementation. With reference to FIG. 4, an exemplary system for implementing the subject matter disclosed herein includes a hardware device 400, including a processing unit 402, memory 404, storage 406, data entry module 408, display adapter 410, communication interface 412, and a bus 414 that couples elements 404-412 to the processing unit 402.

The bus 414 may comprise any type of bus architecture. Examples include a memory bus, a peripheral bus, a local bus, etc. The processing unit 402 is an instruction execution machine, apparatus, or device and may comprise a microprocessor, a digital signal processor, a graphics processing unit, an application specific integrated circuit (ASIC), a field programmable gate array (FPGA), etc. The processing unit 402 may be configured to execute program instructions stored in memory 404 and/or storage 406 and/or received via data entry module 408.

The memory 404 may include read only memory (ROM) 416 and random access memory (RAM) 418. Memory 404 may be configured to store program instructions and data during operation of device 400. In various embodiments, memory 404 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 404 may also include nonvolatile memory technologies such as nonvolatile flash RAM (NVRAM) or ROM. In some embodiments, it is contemplated that memory 404 may include a combination of technologies such as the foregoing, as well as other technologies not specifically mentioned. When the subject matter is implemented in a computer system, a basic input/output system (BIOS) 420, containing the basic routines that help to transfer information between elements within the computer system, such as during start-up, is stored in ROM 416.

The storage 406 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 400.

It is noted that the methods described herein may be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 406, ROM 416 or RAM 418, including an operating system 422, one or more applications programs 424, program data 426, and other program modules 428. A user may enter commands and information into the hardware device 400 through data entry module 408. Data entry module 408 may include mechanisms such as a keyboard, a touch screen, a pointing device, etc. Other external input devices (not shown) are connected to the hardware device 400 via external data entry interface 430. By way of example and not limitation, external input devices may include a microphone, joystick, game pad, satellite dish, scanner, or the like. In some embodiments, external input devices may include video or audio input devices such as a video camera, a still camera, etc. Data entry module 408 may be configured to receive input from one or more users of device 400 and to deliver such input to processing unit 402 and/or memory 404 via bus 414.

A display 432 is also connected to the bus 414 via display adapter 410. Display 432 may be configured to display output of device 400 to one or more users. In some embodiments, a given device such as a touch screen, for example, may function as both data entry module 408 and display 432. External display devices may also be connected to the bus 414 via external display interface 434. Other peripheral output devices, not shown, such as speakers and printers, may be connected to the hardware device 400.

The hardware device 400 may operate in a networked environment using logical connections to one or more remote nodes (not shown) via communication interface 412. The remote node may be another computer, a server, a router, a peer device or other common network node, and typically includes many or all of the elements described above relative to the hardware device 400. The communication interface 412 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 412 may include logic configured to support direct memory access (DMA) transfers between memory 404 and other devices.

In a networked environment, program modules depicted relative to the hardware device 400, or portions thereof, may be stored in a remote storage device, such as, for example, on a server. It will be appreciated that other hardware and/or software to establish a communications link between the hardware device 400 and other devices may be used.

It should be understood that the arrangement of hardware device 400 illustrated in FIG. 4 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) may be realized, in whole or in part, by at least some of the components illustrated in the arrangement of hardware device 400.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 4.

Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the preceding description, the subject matter was described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the preceding context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system comprising:
   one or more processors; and
   a non-transitory computer readable medium storing a plurality of instructions, which when executed, cause the one or more processors to:
   determine, in response to converting a request from a client into a remote procedure call for a scale-out cluster, whether the remote procedure call uses client-side redirection;
   identify, in response to a determination that the remote procedure call uses client-side redirection, a correct node within the scale-out-cluster for the remote procedure call;
   determine whether the client is connected by any physical connection to the identified correct node;
   connect, in response to a determination that the client is not connected by any physical connection to the identified correct node, the client to the identified correct node by establishing a physical connection within a virtual connection from the client to the identified correct node in the scale-out cluster by using a previously unused physical connection within the virtual connection to connect from the client to the identified correct node;
   determine whether the remote procedure call comprises a write request;
   deduplicate data specified by the write request in response to a determination that the remote procedure call comprises the write request; and
   transmit to the identified correct node, via the physical connection from the client to the identified correct node, the write request and deduplicated data, thereby enabling the identified correct node to store the deduplicated data.

2. The system of claim 1, wherein the plurality of instructions further causes the processor to create the virtual connection from the client to the scale-out cluster, the virtual connection comprising a physical connection from the client to a node in the scale-out cluster, in response to receiving a request from the client to connect to the scale-out cluster.

3. The system of claim 2, wherein the plurality of instructions further causes the processor to use the physical connection from the client to the connected node to send the remote procedure call to the scale-out cluster, in response to a determination that the remote procedure call does not comprise any type of remote procedure call that uses client-side redirection.

4. The system of claim 3, wherein the plurality of instructions further causes the processor to:
   determine whether the sent remote procedure call comprises any type of remote procedure call that uses server-side redirection; and
   enable the connected node to respond to the sent remote procedure call, in response to a determination that the sent remote procedure call does not comprise any type of remote procedure call that uses server-side redirection.

5. The system of claim 4, wherein the plurality of instructions further causes the processor to:
   determine whether the connected node comprises a correct node for the sent remote procedure call, in response to a determination that the sent remote procedure call comprises any type of remote procedure call that uses server-side redirection;
   enable the connected node to respond to the sent remote procedure call, in response to a determination that the connected node comprises the correct node for the sent remote procedure call; and
   enable the connected node to redirect the sent remote procedure call to the correct node for the sent remote procedure call and to respond to the sent remote procedure call on behalf of the correct node for the sent remote procedure call, in response to a determination that the connected node does not comprise the correct node for the sent remote procedure call.

6. The system of claim 2, wherein identifying the correct node for the remote procedure call comprises at least one of identifying a node that was previously identified as a correct node for a previous remote procedure call, and using the physical connection from the client to the connected node to send the remote procedure call to the connected node and receive a response identifying the correct node.

7. The system of claim 1, wherein the plurality of instructions further causes the processor to use the physical connection from the client to the identified correct node to send the remote procedure call to the identified correct node and receive a response from the identified correct node, in response to a determination that the remote procedure call does not comprise the write request.

8. A method comprising:
   determining, in response to converting a request from a client into a remote procedure call for a scale-out cluster, whether the remote procedure call uses client-side redirection;
   identifying, in response to a determination that the remote procedure call uses client-side redirection, a correct node within the scale-out-cluster for the remote procedure call;
   determining whether the client is connected by any physical connection to the identified correct node;
   connecting, in response to a determination that the client is not connected by any physical connection to the identified correct node, the client to the identified correct node by establishing a physical connection within a virtual connection from the client to the identified correct node in the scale-out cluster by using a previously unused physical connection within the virtual connection to connect from the client to the identified correct node;
   determining whether the remote procedure call comprises a write request;
   deduplicating data specified by the write request in response to a determination that the remote procedure call comprises the write request; and transmitting to the identified correct node, via the physical connection from the client to the identified correct node, the write request and deduplicated data, thereby enabling the identified correct node to store the deduplicated data.

9. The method of claim 8, wherein the computer-implemented method further comprises creating the virtual connection from the client to the scale-out cluster, the virtual connection comprising a physical connection from the client to a node in the scale-out cluster, in response to receiving a request from the client to connect to the scale-out cluster.

10. The method of claim 9, wherein the computer-implemented method further comprises using the physical connection from the client to the connected node to send the remote procedure call to the scale-out cluster, in response to a determination that the remote procedure call does not comprise any type of remote procedure call that uses client-side redirection.

11. The method of claim 10, wherein the computer-implemented method further comprises:
determining whether the sent remote procedure call comprises any type of remote procedure call that uses server-side redirection; and
enabling the connected node to respond to the sent remote procedure call, in response to a determination that the sent remote procedure call does not comprise any type of remote procedure call that uses server-side redirection.

12. The method of claim 11, wherein the computer-implemented method further comprises
determining whether the connected node comprises a correct node for the sent remote procedure call, in response to a determination that the sent remote procedure call comprises any type of remote procedure call that uses server-side redirection;
enabling the connected node to respond to the sent remote procedure call, in response to a determination that the connected node comprises the correct node for the sent remote procedure call; and
enabling the connected node to redirect the sent remote procedure call to the correct node for the sent remote procedure call and to respond to the sent remote procedure call on behalf of the correct node for the sent remote procedure call, in response to a determination that the connected node does not comprise the correct node for the sent remote procedure call.

13. The method of claim 9, wherein identifying the correct node for the remote procedure call comprises at least one of identifying a node that was previously identified as a correct node for a previous remote procedure call, and using the physical connection from the client to the connected node to send the remote procedure call to the connected node and receive a response identifying the correct node.

14. The method of claim 8, wherein the computer-implemented method further comprises using the physical connection from the client to the identified correct node to send the remote procedure call to the identified correct node and receive a response from the identified correct node, in response to a determination that the remote procedure call does not comprise the write request.

15. A computer program product, comprising a non-transitory computer-readable medium having a computer-readable program code embodied therein to be executed by one or more processors, the program code including instructions to:

determine, in response to converting a request from a client into a remote procedure call for a scale-out cluster, whether the remote procedure call uses client-side redirection;
identify, in response to a determination that the remote procedure call uses client-side redirection, a correct node within the scale-out-cluster for the remote procedure call;
determine whether the client is connected by any physical connection to the identified correct node;
connect, in response to a determination that the client is not connected by any physical connection to the identified correct node, the client to the identified correct node by establishing a physical connection within a virtual connection from the client to the identified correct node in the scale-out cluster by using a previously unused physical connection within the virtual connection to connect from the client to the identified correct node;
determine whether the remote procedure call comprises a write request;
deduplicate data specified by the write request in response to a determination that the remote procedure call comprises the write request; and
transmit to the identified correct node, via the physical connection from the client to the identified correct node, the write request and deduplicated data, thereby enabling the identified correct node to store the deduplicated data.

16. The computer program product of claim 15, wherein the program code includes further instructions to create the virtual connection from the client to the scale-out cluster, the virtual connection comprising a physical connection from the client to a node in the scale-out cluster, in response to receiving a request from the client to connect to the scale-out cluster, wherein identifying the correct node for the remote procedure call comprises at least one of identifying a node that was previously identified as a correct node for a previous remote procedure call, and using the physical connection from the client to the connected node to send the remote procedure call to the connected node and receive a response identifying the correct node.

17. The computer program product of claim 16, wherein the program code includes further instructions to use the physical connection from the client to the connected node to send the remote procedure call to the scale-out cluster, in response to a determination that the remote procedure call does not comprise any type of remote procedure call that uses client-side redirection.

18. The computer program product of claim 17, wherein the program code includes further instructions to:
determine whether the sent remote procedure call comprises any type of remote procedure call that uses server-side redirection; and
enable the connected node to respond to the sent remote procedure call, in response to a determination that the sent remote procedure call does not comprise any type of remote procedure call that uses server-side redirection.

19. The computer program product of claim 18, wherein the program code includes further instructions to:
determine whether the connected node comprises a correct node for the sent remote procedure call, in response to a determination that the sent remote procedure call comprises any type of remote procedure call that uses server-side redirection;

enable the connected node to respond to the sent remote procedure call, in response to a determination that the connected node comprises the correct node for the sent remote procedure call; and enable the connected node to redirect the sent remote procedure call to the correct node for the sent remote procedure call and to respond to the sent remote procedure call on behalf of the correct node for the sent remote procedure call, in response to a determination that the connected node does not comprise the correct node for the sent remote procedure call.

20. The computer program product of claim 15, wherein the program code includes further instructions to use the physical connection from the client to the identified correct node to send the remote procedure call to the identified correct node and receive a response from the identified correct node, in response to a determination that the remote procedure call does not comprise the write request.

* * * * *